(12) United States Patent
Stuart

(10) Patent No.: US 6,525,853 B1
(45) Date of Patent: Feb. 25, 2003

(54) LASER COMMUNICATION SYSTEM AND METHOD OF OPERATION USING MULTIPLE TRANSMITTERS AND MULTIPLE RECEIVERS WITH DISPERSIVE MULTIPLEXING IN MULTIMODE FIBER

(75) Inventor: Howard Roy Stuart, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/397,015

(22) Filed: Sep. 15, 1999

(51) Int. Cl.[7] .................................................. H04J 14/02
(52) U.S. Cl. .......................... 359/127; 359/130; 385/18; 385/24
(58) Field of Search ................................. 359/127, 124, 359/125, 130, 177; 385/18, 24

(56) References Cited

U.S. PATENT DOCUMENTS

| 4,143,941 | A | * | 3/1979 | Soref | 385/18 |
| 4,867,519 | A | * | 9/1989 | Roy et al. | 385/24 |
| 5,321,541 | A | * | 6/1994 | Cohen | 359/127 |
| 6,094,285 | A | * | 7/2000 | Wickham et al. | 359/130 |

OTHER PUBLICATIONS

Journal of Lightwave Technology, A Joint IEEE/OSA Publication, Mar. 1998, vol. 16, No. 3. Title: "An Experimental and Theoretical Study of the Offset Launch Technique for the Enhancement of the Bandwidth of Multimode Fiber Links".

Electronics Letters, The Institute of Electrical Engineers, Apr. 2, 1998, vol. 34, No. 7.
Technical Digest, OFC/IOOC '99, Feb. 21–26, 1999, pp. 80/FD7–1 through 82/FD7–3.
Photonics Technology Letters, IEEE, Oct. 1998, vol. 10, No. 10. Title: "Low–Cost Multimode WDM for Local Area Networks Up to 10 Gb/s".
Bell Labs Technical Journal, vol. 1, No. 2, Autumn 1996. Title: "Layered Space–Time Architecture for Wireless Communication in a Fading Environment When Using Multi-Element Antennas".
Electronics Letters, The Institute of Electrical Engineers, Jan. 7, 1999, vol. 35, No. 1, pp. 14–16.

* cited by examiner

Primary Examiner—John A. Tweel
(74) Attorney, Agent, or Firm—Morgan & Finnegan LLP

(57) ABSTRACT

A laser communication system includes transmitters and detectors coupled to a multimode fiber through "arms", which can consist of N optical fibers joined to the main fiber through a 1×N fiber splitter. A set of N data streams is RF modulated onto RF carriers of identical frequency. RF modulated data streams are used to intensity modulate the N laser transmitters. N optical signals are combined onto the single multimode fiber for transmission to M multiple detectors, where M≧N. Each M detector receives power from all N transmitting lasers. The M detectors utilize direct optical detection to convert the received optical signal to a RF signal, which can be demodulated using standard RF techniques. The inherent modal-coupling diversity between the arms introduced by the optical system, when combined with modal dispersion in the multimode fiber, introduces a decorrelation in both the transmitted and received signal arrays to enhance signal throughput.

20 Claims, 6 Drawing Sheets

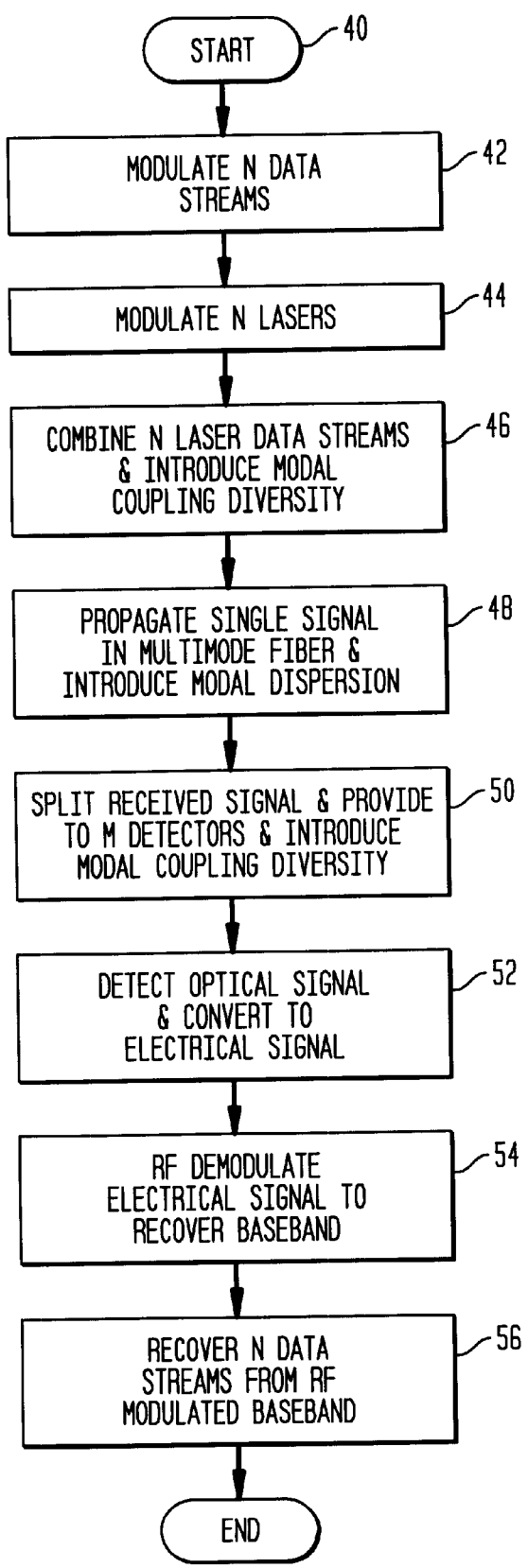

LASER COMMUNICATION SYSTEM AND METHOD OF OPERATION USING MULTIPLE TRANSMITTERS AND MULTIPLE RECEIVERS WITH DISPERSIVE MULTIPLEXING IN MULTIMODE FIBER

BACKGROUND OF THE INVENTION

1. Field of Invention

This invention relates to laser communication systems and methods of operation. More particularly, the invention relates to laser communication systems and methods of operation using multiple transmitters and multiple receivers with dispersive multiplexing in multimode fiber.

2. Background Discussion

In laser communication systems, the information capacity of multimode fiber, from a fundamental standpoint, is greater than that of single mode fiber. In practice, however, modal dispersion makes it impossible to use that capacity in any straightforward manner. However, the capacity of laser communication systems using multimode fiber can be increased by borrowing from recently developed techniques in wireless communications. In wireless systems, radio waves do not propagate simply from transmit antenna to receive antenna, but bounce and scatter randomly off objects in the environment. This scattering is known as multipath and it results in multiple copies of the transmitted signal arriving at the receiver via different scatter paths.

A technique known as BLAST (Bell Labs Layered Space-Time) utilizes multipath effects in a scattering environment to increase the capacity of a wireless channel. BLAST exploits multipath by using the scattering characteristics of the propagation environment to enhance, rather than degrade transmission accuracy by treating the multiplicity of scattering paths as separate parallel subchannels. BLAST enhances multipath by splitting a single user's data stream into multiple substreams and using an array of transmitter antennas to simultaneously launch parallel substreams. All the substreams are transmitted in the same frequency band, so spectrum is used very efficiently. Since the user's data is being sent in parallel over multiple antennas, the effective transmission rate is increased roughly in proportion to the number of transmitter antennas. At the receiver an array of antennas is again used to pick up the multiple transmitted substreams and their scattered images. Each receiver receives all of the transmitted substreams superimposed, not separately. However, if the multipath scattering is sufficient, then the multiple substreams are all scattered slightly differently since they originate from different transmit antennas that are located at different points in space. Using sophisticated signal processing, these slight differences in scattering allow the substreams to be identified and recovered. Further details on BLAST are described in an article entitled "Layer space-time Architecture for Wireless Communication in a Fading Environment When Using Multiple Antennas" by G. J Foschini, Bell Labs Technical Journal, Vol. 1, No. 2 Autumn 1996, pages 41–59.

Since multimode fibers mirror multipath effects in a wireless communication system, the capacity of the multimode fiber can be increased by modulating N data streams onto the same RF carrier with each data stream modulating a laser coupled to a multimode fiber. At the receiving end, the signal is split into M fibers that feed M receivers where M is greater than or equal to N. The signals received at each receiver will contain power from all the transmitters. If the individual received signals are uncorrelated, the same signal processing algorithms used in the BLAST architecture can be used to recover the N data streams.

SUMMARY OF THE INVENTION

An object of the invention is a laser communication system and method of operation combining transmitter/receiver diversity and modal dispersion to increase capacity without having to increase transmission speed or WDM channels.

Another object is a laser communication system and method of operation using multiple lasers and multiple detectors in conjunction with multimode fiber to improve transmission characteristics of the fiber.

Another object is transmitting N parallel data streams over a single multimode fiber in a laser communication system and distributing uncorrelated signals to M receivers where M is greater than or equal to N and each receiver receives all N signals.

These and other objects, features and advantages are achieved in a laser communication system and method of operation combining transmitter/receiver diversity and multimode fiber dispersion. Multiple transmitters and multiple detectors are coupled to the multimode fiber. The transmitters and detectors are coupled to the multimode fiber through "arms" which can consist, for example, of N optical fibers joined to the main fiber through a 1×N fiber splitter, where N is the number of data signals. Alternatively, the "arms" can be formed by either butt-coupling or free-space optical coupling to the fiber of the multiple lasers and detectors either in individual device or array configuration. The system makes use of the inherent modal-coupling diversity between the "arms" introduced by the optical system. The diversity, when combined with modal dispersion in the multimode fiber, introduces uncorrelation in both the transmitted and received signal arrays. A set of N data streams is RF modulated onto RF carriers of identical frequency. Any RF modulation format can be chosen though the identical format must be used for all N data streams. The N RF modulated data streams are used to intensity modulate the N laser transmitters. The N optical signals are combined onto the single multimode fiber for transmission of an optical signal to the multiple detectors. The optical signal at the end of the multimode fiber is fed, by one of the means described above, to M detectors, where M is greater than or equal to N. Each M detector receives power from all N transmitting lasers. The M detectors utilize direct optical detection to convert the received optical signal to a RF signal, which can be demodulated using standard RF techniques. A known set of bits is sent at the start of each transmission to allow the receiver to estimate the M×N transmission matrix. The uncorrelation introduced by the transmitter and receiver diversity allows the original N data streams to be recovered by signal processing algorithms. Since the data streams are being sent over multipaths, the effective transmission rate is increased, roughly in proportion to the number of transmitters. Because the modulated RF carrier frequencies are identical for each transmitter, this increased transmission rate requires only the electrical bandwidth used to modulate one of the transmitting lasers.

DESCRIPTION OF DRAWING

The invention will be further understood from the following description of a preferred embodiment taken in conjunction with an appended drawing, in which:

FIG. 4 is a flow diagram for the operation of the system of FIG. 3.

DESCRIPTION OF PREFERRED EMBODIMENT

Applying the principles of BLAST, the capacity of laser communication systems in terms of transmission bit rates or the length of fiber for a given bit rate can be increased through signal diversity and modal dispersion. The combination of signal diversity and modal dispersion causes the received signals to be uncorrelated and eligible for signal processing in accordance with signal detection processes described in an article "Detection Algorithm and Initial Laboratory Results Using V-BLAST Space-Time Communication Architecture" by G. D. Golden et al., published in Electronic Letters, Jan. 7, 1999, Vol. 35, No. 1, pages 14–15.

Signal diversity can be introduced into the laser communication system using several alternatives. In one alternative, shown in FIG. 1, an array of N transmitter lasers 10 are optically coupled to a multimode fiber 12 using free-space optics. At the end of the fiber the received signals are provided to a 1×M fiber splitter 14 coupled to M detectors 16 where M is greater than or equal to N.

Figure 2:
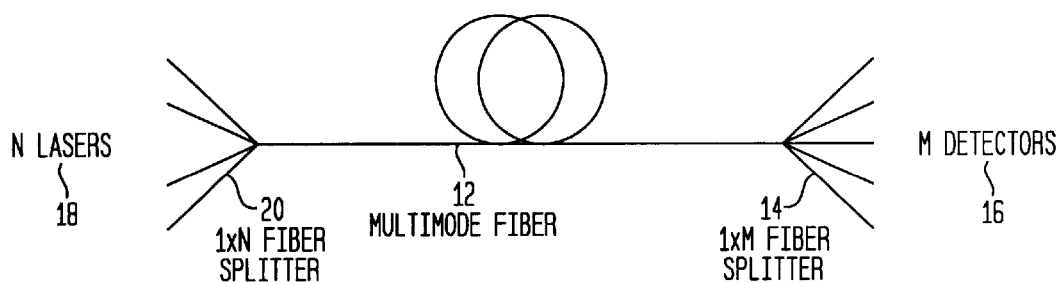
FIG. 2 is a representation of a second embodiment of a laser communication system incorporating the principles of the present invention.

In another embodiment, shown in FIG. 2, a plurality of N lasers 18 are provided to a 1×N fiber splitter 20 to join the signals to the multimode fiber 12. The signal is split at the receiving end with the fiber splitter 14 coupled to the detectors 16.

Other alternatives may be used for achieving signal diversity in the multimode fiber. A vertical cavity surface emitting laser (VCSEL) array could be installed at the transmitter end and a detector array at the receiver end with either of these devices either butt-coupled to the fiber or coupled using free-space optics. Various permutations of butt-coupled, free-space coupled, and fiber-coupled transmitters and receivers could be employed in the present invention.

If desired, transmitter and/or receiver diversity can be enhanced by using chirped fiber gratings in the N transmitter arms and/or the M receiver arms. If the fiber gratings are designed properly, the impulse responses can be decorrelated without increasing the time duration of the impulse responses dramatically. Fiber gratings introduce the fact that a fiber grating of a given period will reflect some modes but not others. Thus, a series of fiber gratings of different chirps can be incorporated into the arms of the 1×N splitter, for example. In one grating, slow modes are given a shorter path length and fast modes are given a longer path length. In another grating, fast modes would have the shorter path length, and the slow modes would have the longer path length. More complicated chirps can be designed to create an almost arbitrary set of impulse responses for the N arms.

Figure 1:
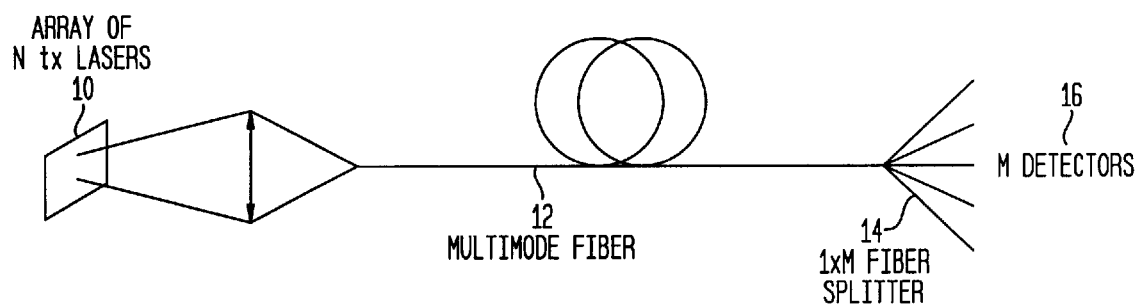
FIG. 1 is a representation of a first embodiment of a laser communication system incorporating the principles of the present invention.
Figure 3:
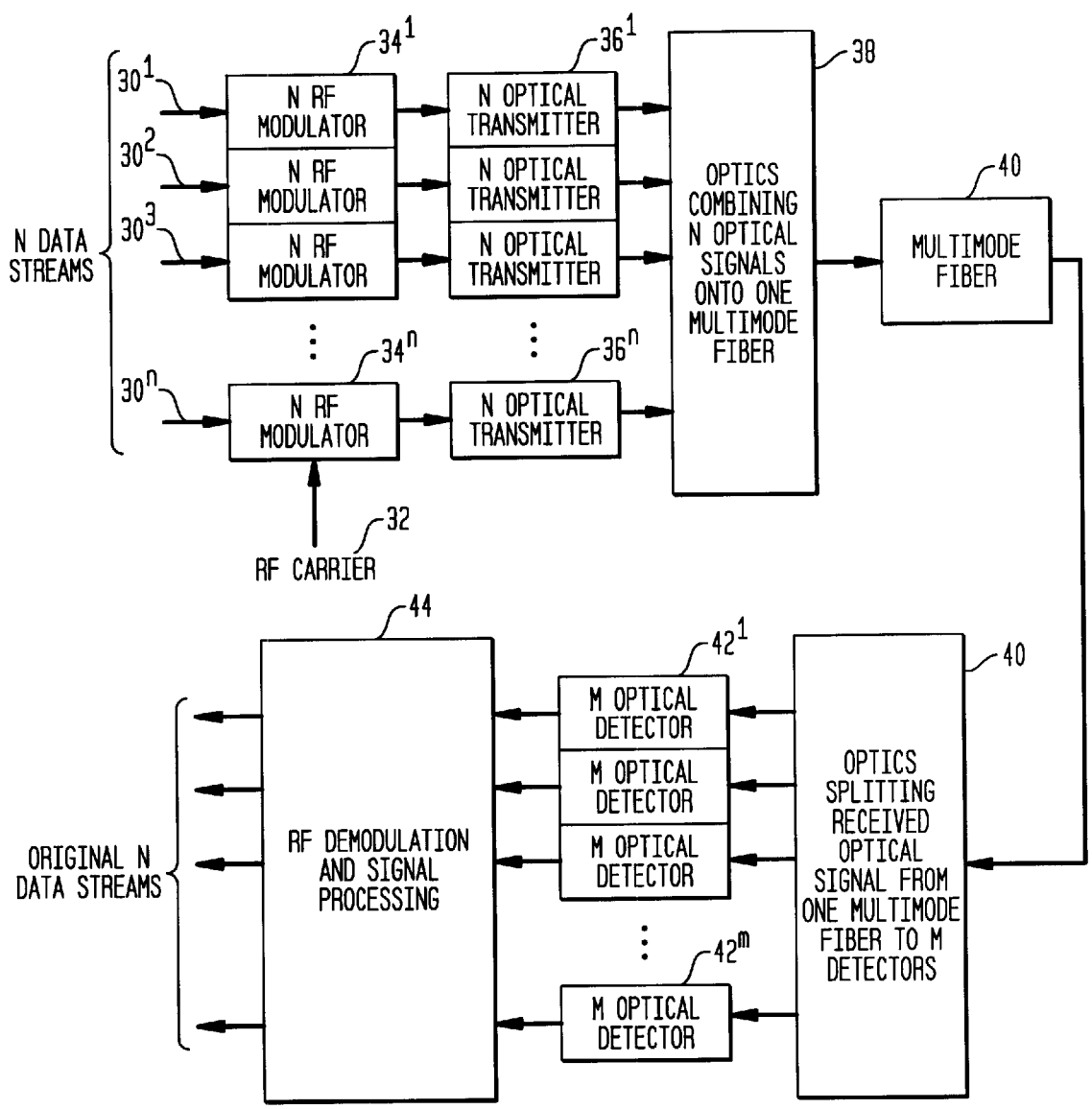
FIG. 3 is a more detailed representation of the laser communication systems of FIGS. 1 and 2.

FIG. 3 shows a more detailed version of the laser systems of FIGS. 1 and 2 in which both signal diversity and modal dispersion are introduced into N data streams $30^1, 30^2, \ldots, 30^n$. Each data stream modulates a RF carrier 32 in RF modulators $34^1, \ldots, 34^n$. The RF modulated data signals intensity modulate N optical transmitters $36^1, \ldots, 36^n$. The RF intensity modulated laser signals are applied to an optics combining mechanism 38, described, for example, in connection with FIGS. 1 and 2, and applied as a combined optical signal to multimode fiber 40 which provides modal dispersion of the N data signals.

At the multimode fiber receiving end, an optical splitter 42 receives the signal and provides N data signals to each of the M optical detectors $42^1, \ldots 42^M$, where M the number of optical detectors is greater than or equal to N. Each optical detector receives all of the N data signals in different forms due to the modal dispersion from the multimode fiber, and the modal-coupling diversity introduced by the optical system coupling the fiber to the detectors. The M optical signals are demodulated and detected in signal processor 44 to recover the N original data signals. The signal detection is in accordance with the BLAST article, supra, after conventional RF demodulation.

The process of transmitting and receiving the N data signals will be described in conjunction with FIG. 4.

The process begins in block 40 after which N data streams are modulated onto identical RF carriers in block 42. The RF modulated carriers intensity modulate N lasers in block 44 which introduces signal diversity into the N data streams. The N intensity modulated laser signals are combined optically in block 46 in a process which introduces diversity between the transmitter "arms" as described in connection with FIGS. 1 and 2. The single data stream is propagated through the multimode fiber in block 48. Modal dispersion is introduced due to the nature of the fiber. Prior to signal transmission a known bit stream is transmitted to the receivers at a training step for the receivers in estimating the channel characteristics. In block 50 the received signal is split into M signal paths and provided to M detectors. The optical coupling from the multimode fiber to the detectors introduces modal coupling diversity. Each M detector receives all of the transmitted N data streams in different forms due to detector diversity and modal dispersion. In block 52, the M detectors convert the M optical signals to RF modulated signals on the same RF carrier. In block 54, the RF modulated signals are demodulated to recover the base band. In block 56, the N data streams are recovered using signal processing techniques described in the BLAST article, supra.

Alternatively, steps 54 and 56 can be interchanged and need not be performed in the order described in FIG. 4.

Because of the statistical nature of the modal coupling, there may arise situations in which the channel characteristics become undesirable for high capacity transmission. Rather than waiting for changes in the channel to occur, one can alter the characteristics of the M×N transmission matrix by inducing small variations in any number of parameters of the system. These parameters include, but are not limited to, the laser driver current, the mechanical positioning of the lasers and coupling optics, the mechanical positioning of the fiber, and the RF carrier frequency.

Figure 5A:
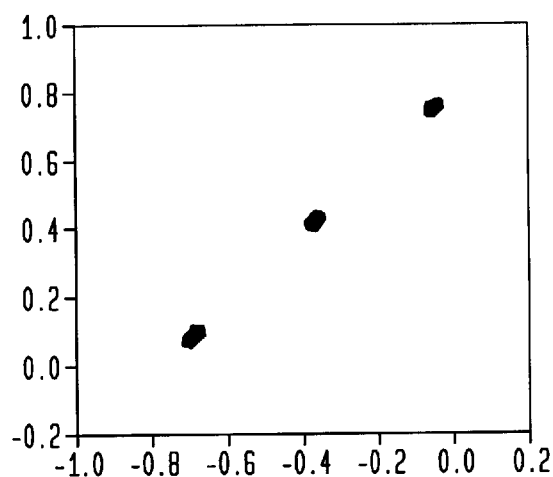
FIGS. 5A and B are a plot of Binary Phase Shift Key (BPSK) modulated laser signals in terms of real and imaginary components received at two detectors in a laser communication system using two transmitters and multimode fiber with transmitter/receiver diversity, but with negligible modal dispersion (<1 meter of fiber).
Figure 5B:
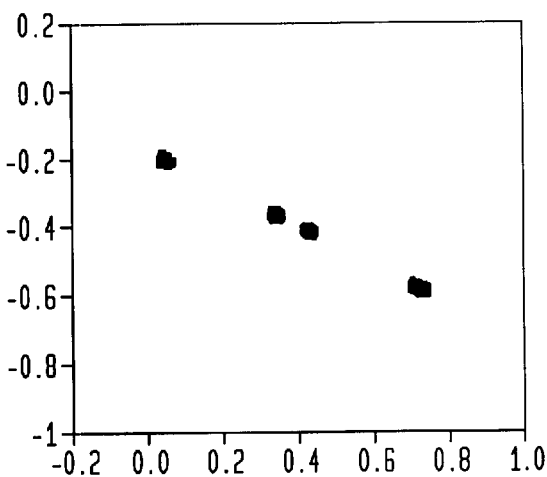

Turning to FIGS. 5A and B, constellation diagrams are shown for two receivers in a laser communication system using two transmitters and two receivers and a short length (<1 meter) of multimode fiber. The constellations in FIGS. 5A and B are obtained by modulating the two transmitting lasers with Binary Phase Shift Key (BPSK) modulated data, which sets the phase of the RF carrier to 0 or 180 degrees depending on whether the bit is a zero or one. The constellation diagram is a display in phase space of the magnitude and phase of the received RF carrier, with the signal sampled once per bit period. The axes of the graphs represent the real and imaginary axes in phase space. FIGS. 5 A and B show data for a stream of 256 random bits. For conventional BPSK transmission, the constellation diagram will consist of two points corresponding to a zero or one. In this example, because each receiver receives information from two transmitters, one expects to see a three-point constellation in the absence of diversity and modal dispersion (as would be observed, for example, with the use of single mode fiber). The three points correspond to the data pairs (1,1), (0,0), and [(1,0),(0,1)]. The latter pair of points cannot be resolved. Four signal points are required to completely recover the transmitted information. In FIG. 5A, a three-point constellation is observed. FIG. 5B shows nearly a three-point constellation, except one signal point has been divided into two points. This results because of a small degree of power-splitting diversity in the fiber splitters. Recovery of the transmitted data from these constellations would result in a large increase in the noise, due to the poorly conditioned transmission matrix. FIGS. 5A and B demonstrate that without modal dispersion, the transmitted information is difficult to recover.

Figure 6A:
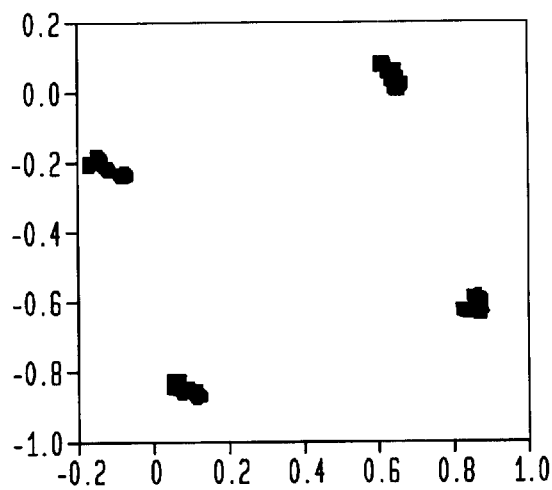
FIGS. 6A and B are a plot of Binary Phase Shift Key (BPSK) modulated laser signals in terms of real and imaginary components received at two detectors in a laser communication system using two transmitters and one kilometer of multimode fiber with transmitter/receiver diversity.
Figure 6B:
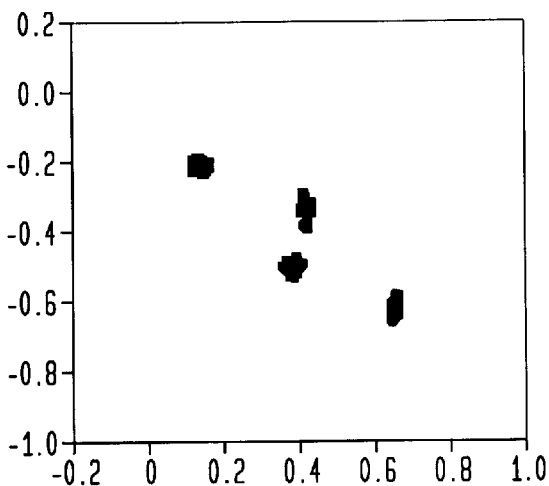

In contrast, in FIGS. 6A and B, the introduction of 1 km of multimode fiber causes the constellations to spread into well-separated four-point arrangements. Each receiver receives a different arrangement of the four signal points which is representative of different versions of the transmitted signal. The transmission matrix for this example is well conditioned, and can be inverted without introducing excessive noise.

Figure 7A:
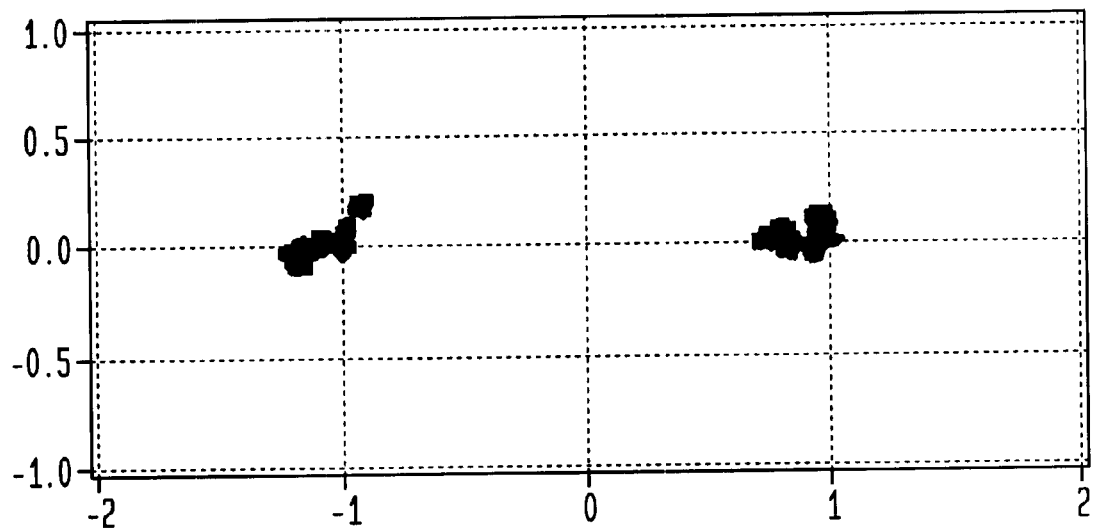
FIGS. 7A and B are a plot of the two laser signals of FIG. 6 in terms of real and imaginary components after processing and demonstrating the recovery of the data signals.
Figure 7B:
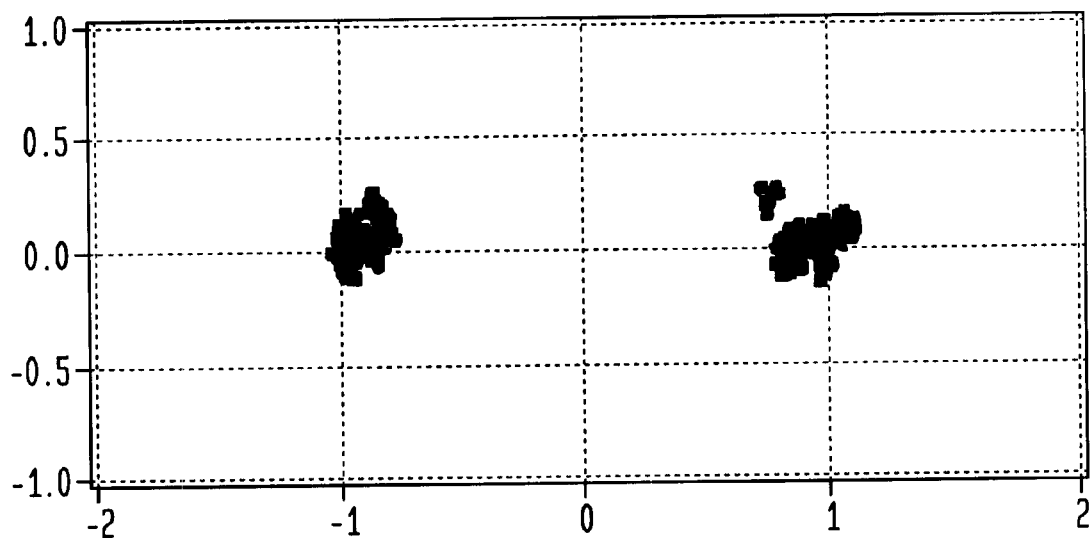

FIGS. 7A and B shows the received constellation diagrams after application of the signal processing algorithm. The Figures demonstrates that the original BPSK modulated data are recovered.

Figure 8:
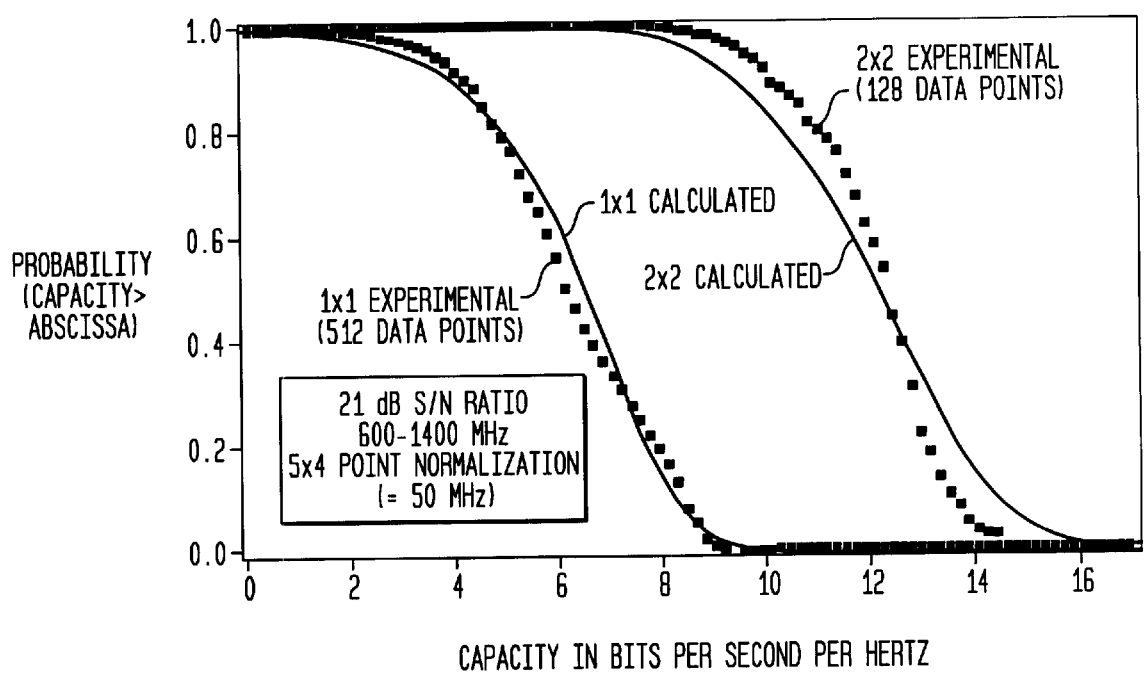
FIG. 8 is a graph in terms of probability of the capacity of a multimode fiber, which is capacity in bits per second per hertz for a single transmitter and a single receiver, calculated and experimental, and two transmitters and receivers calculated and experimental.

FIG. 8 shows the cumulative distribution function of the capacity of multimode fiber and demonstrates the capacity of the multimode fiber is increased in the 2×2 system. The solid lines in the graph are theoretical predictions for the case of 1×1 and 2×2 systems under the assumption of Rayleigh fading statistics, computed from the following formula:

$$Cap = \log_2\left\{\det\left[I_M + \frac{\rho}{M}HH^\dagger\right]\right\} \text{ bits/sec/Hz}$$

where,
$I_M$=M×M identity matrix
$\rho$=average received signal to noise ratio for a 1×1 transmission (single transmitter and receiver)
H=M×N normalized transmission matrix The formula is nearly identical to that derived in the article entitled "On limits of wireless communications in a fading environment when using multiple antennas" by G. J. Foschini and M. J. Gans, *Wireless Personal Communications* 6, 311–335 (1998). The slight difference (the M in the denominator of the second term in brackets is an N for the wireless case) is due to some differences between the assumptions for the optical and wireless versions of BLAST. For square arrays, the formulas are identical, and predictions of capacity can be found in the Foschini and Gans paper, supra, The dotted lines in the graph are experimental values for capacity, taken from an ensemble of measurements of actual fiber transmission matrices H over a range of frequencies. That the 2–2 curve matches well with the theoretical curve is indicative of the presence of diversity in the transmission channel and can be taken as direct evidence that there is a higher capacity 2–2 optical sys tem than there is in the 1×1 optical system.

While the invention has been described in a preferred embodiment, various changes can be made without departing from the spirit and scope of the invention, as defined in the appended claims, in which:

I claim:

1. A laser communication system having increased signal throughput comprising:

a) means coupling N optical transmitters responsive to N data signals to a multimode fiber and introducing modal coupling diversity;

b) means transmitting an optical signal on the multimode fiber;

c) means coupling the multimode fiber to M detectors and introducing modal coupling diversity; and d) means coupled to the M detectors for receiving and recovering the N data signals.

2. The laser communication system of claim 1 further comprising:

means for enhancing the transmitter and receiver modal coupling diversity.

3. The laser communication system of claim 1 further comprising:

means for combining N optical signals onto the multimode fiber.

4. The laser communication system of claim 3 further comprising:

means introducing modal diversity among the combined N optical signals.

5. The laser communication system of claim 1 further comprising:

means for splitting the optical signal from the multimode fiber to the M detectors.

6. The laser communication system of claim 5 further comprising:

means introducing modal coupling diversity among the split optical signals.

7. The laser communication system of claim 1 further comprising:

means varying the geometry of the transmitting optical transmitters to vary the mode power distribution of the N modulated data signals.

8. The laser communication system of claim 1 further comprising:

mean modulating the N data signals coupled to the N optical transmitters.

9. The laser communication system of claim 1 further comprising:

means for converting the split optical signals to electrical signals corresponding to the N data signals.

10. The laser communication system of claim 1 wherein all M detectors receive the same optical signals from the multimode fiber.

11. The laser communication system of claim 1 wherein the optical signal from the multimode fiber is split into N uncorrelated data signals.

12. The laser communication system of claim 1 wherein the M detectors is equal to or greater than the N data signals.

13. A laser communication system having increased signal throughput comprising:
   a) N data signal sources;
   b) means for modulating the N data signal sources;
   c) means coupling each modulated data signal source to an optical transmitter;
   d) means coupling each optical transmitter to a multimode fiber as a combined optical signal and introducing modal coupling diversity among the N transmitters;
   e) means transmitting the optical signal on the multimode fiber and introducing modal dispersion;
   f) means splitting the optical signal from the multimode fiber to M optical signal detectors and introducing modal coupling diversity among the M detectors; and
   g) means coupled to the M detectors for recovering the N data signals from the optical signal.

14. In a laser communication system including N data signal sources coupled to optical transmitters coupled to multimode fiber for carrying an optical signal to M optical detectors, a method for increasing the signal throughput of the communication system, comprising the steps of:
   a) modulating the N data signal sources onto identical RF carriers;
   b) coupling the N modulated signal sources to N optical transmitters;
   c) coupling the N optical transmitters to a multimode fiber and introducing modal coupling diversity between the transmitters;
   d) transmitting an optical signal on the multimode fiber;
   e) coupling the multimode fiber to M detectors for receiving the optical signal and introducing modal coupling diversity between the detectors; and
   f) recovering the N data signals from the optical signal received by the M detectors.

15. The method of claim 14 further comprising the step of: providing a combined output from the optical transmitters.

16. The method of claim 14 further comprising the step of: providing a split optical signal from the multimode fiber to the M detectors.

17. The method of claim 14 further comprising the step of: providing each M detector with the same signal from the multimode fiber.

18. The method of claim 14 further comprising the step of: providing each M detector with N uncorrelated data signals.

19. The method of claim 14 further comprising the step of: selecting the number of M detectors to be equal to or greater than the number of N data signals.

20. The method of claim 16 further comprising the step of: converting the split optical signals into N electrical data signals.

* * * * *